J. SCARAMUCCI.
CATTLE STANCHION.
APPLICATION FILED MAR. 7, 1912.
1,031,091.
Patented July 2, 1912.
2 SHEETS—SHEET 2.
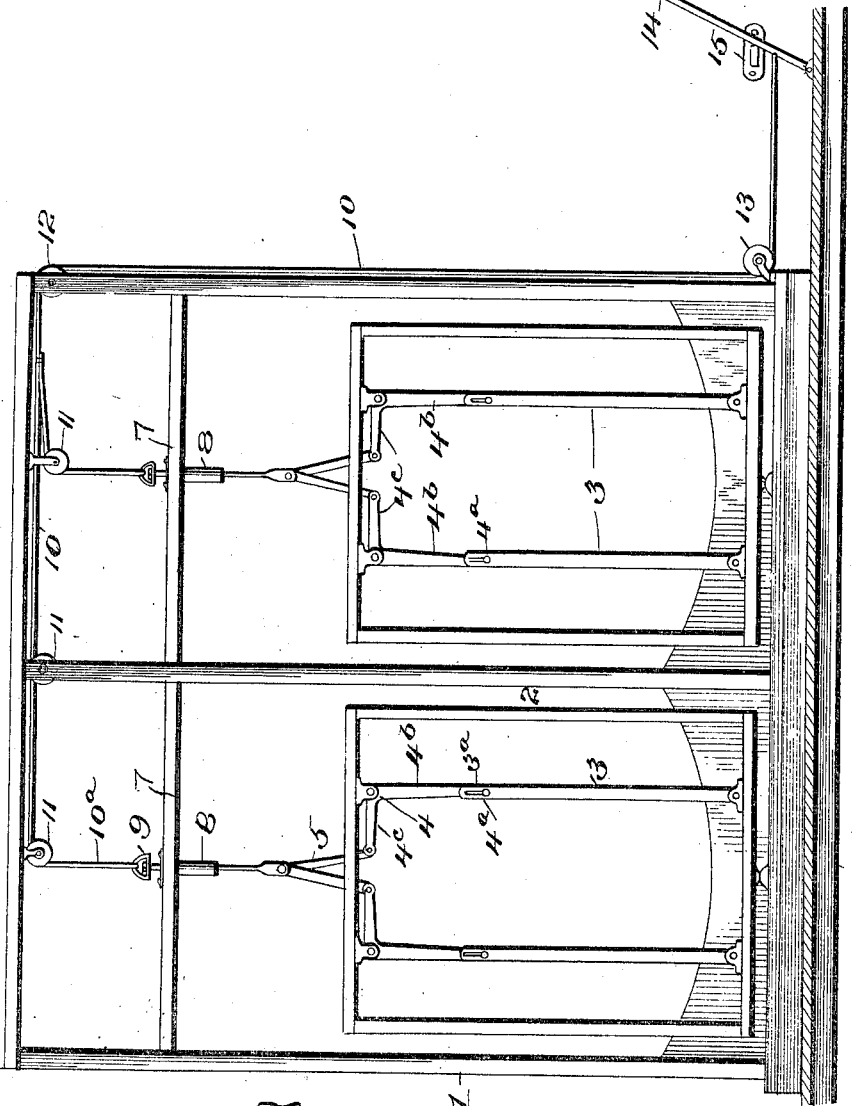
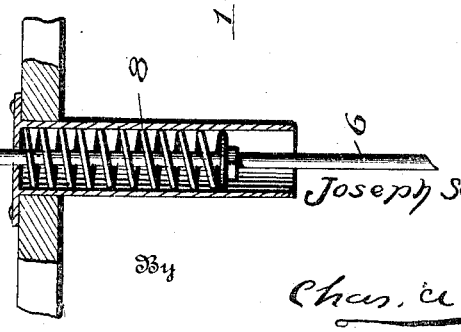
Witnesses
Inventor
Joseph Scaramucci
By
Chas. A. Briscoe
Attorney

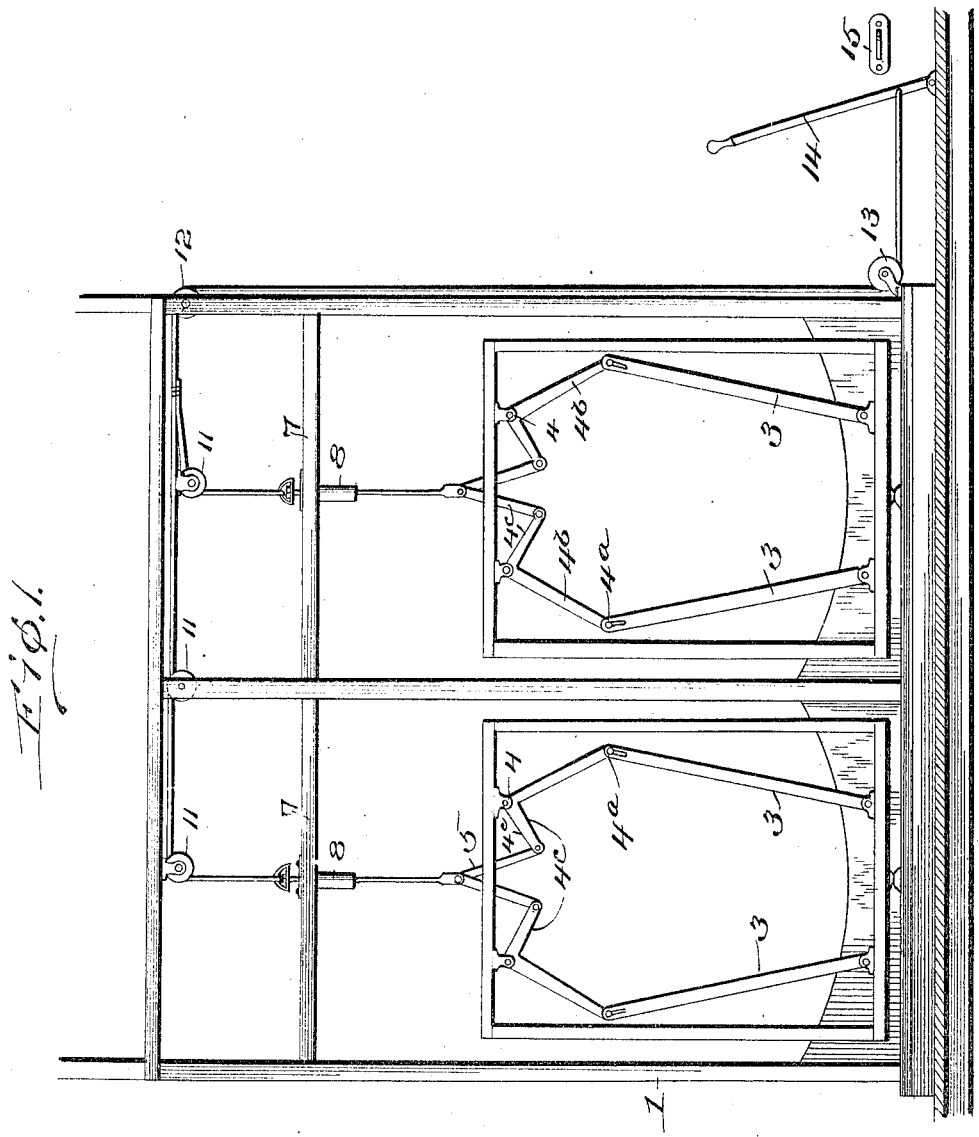

UNITED STATES PATENT OFFICE.

JOSEPH SCARAMUCCI, OF BELMONT, NEW YORK, ASSIGNOR OF ONE-THIRD TO ANDREW GUIDARELLI, OF BELMONT, NEW YORK.

CATTLE-STANCHION.

1,031,091.    Specification of Letters Patent.    Patented July 2, 1912.

Application filed March 7, 1912. Serial No. 682,153.

*To all whom it may concern:*

Be it known that I, JOSEPH SCARAMUCCI, a citizen of the United States, residing at Belmont, in the county of Allegany and State of New York, have invented certain new and useful Improvements in Cattle-Stanchions, of which the following is a specification.

My invention relates to a class of devices used in holding cattle in their stalls, known as cattle stanchions, and in particular to that class of cattle stanchions in which a row of such stanchions may be opened and closed, and be held either in the open or closed position, simultaneously, and by a single movement of the person operating the device.

In the drawings which accompany this specification and form a part thereof and in which like letters of reference refer to like parts in all the views shown:—Figure 1 is a front elevation of the head portions of two stalls equipped with the device, with the stanchions open; Fig. 2 is a front elevation of the same showing the stanchions closed; and, Fig. 3 is a view, partly in section, of the spring mechanism of the device.

At a suitable point above the floor of the stall 1, and suitably with reference to the stanchion-manger, is rigidly secured a stanchion-frame 2, preferably in the form of a parallelogram. The portion of the device carried within the stanchion-frame comprises on each side, a lower member 3, pivotally secured to the bottom bar 2ª of the stanchion frame 2 and having a longitudinal slot 3ª in its upper portion, a bell crank 4, furnished with a pin 4ª adapted to work in the slot 3ª, pivotally secured at its angle, to the top bar 2ᵇ, of the stanchion 2. Pivotally secured, at their lower ends respectively, to each of the bell cranks 4, are connecting arms 5, each of said arms being also pivotally secured at its upper end to the vertical rod 6, in such a manner that a vertically upward pull on the rod 6 tends to bring the arms 5 together and to bring the lower member 3 of the stanchion to a vertical position. The rod 6 passes through a cross bar 7 above the stanchion-frame 2. A spring 8, having one terminal secured on the rod 6 and its other terminal secured on the cross bar 7 is disposed about the rod 6, the tension thereof forcing the rod 6 vertically downward. A stop 9 is fixedly secured on the rod 6 above the cross bar 7, limiting the downward movement of the rod 6 under the tension of the spring 8. A flexible connection 10ª is secured to the stop 9 or to the rod 6 above the stop 9, and passes vertically upward to a pulley 11, over the same, and is fastened to a main flexible connection 10. The main flexible connection 10 passes over the pulleys 12 and 13 to a lever 14, pivotally secured to the floor of the stable. A catch 15, adapted to hold the lever 14 when the same is turned backward and away from the row of stalls, is mounted on the wall of the stable or in any convenient position or manner. Any desired number of stanchions in a row of stalls may be similarly connected with the lever 14, and, with an obvious arrangement of pulleys, the stanchions in the stalls on two or more sides of a stable can be so connected.

The stanchion stands normally open, the downward pressure of the spring 8, exerted through the arms 5, the bell cranks 4, the pins 4ª, and the slots 3ª, forcing apart the lower members 2 pivotally on their lower extremities and thus permitting the entrance of the head of the animal, the drop of the rod 6 under pressure of the spring 8 being limited by the stop 9 when the same is brought in contact with the cross bar 7, preventing undue and unnecessary spreading of the stanchion. The stanchion is closed by throwing back the lever 14, which is locked in position by the catch 15, the flexible connection 10, when the lever 14 is thrown back, operating through the pulleys and the flexible connections 10ª to lift the rod 6 against the tension of the spring 8. The lifting of the rod 6, acting through the arms 5, the bell crank 4, the pin 4ª, the slot 3ª, brings the lower member 3 of the stanchion into a neutral position, in line with the lower member 4ᵇ of the bell crank 4, and the device is locked by the engagement of the lever 14 with the catch 15.

In practice, the cattle are driven into the stalls, with the stanchion held open under the pressure of the springs 8. The head of each animal is naturally inserted in the opening so made. The lever 14 is then thrown back engaging the catch 15 through the pull exerted through the flexible connection 10 over the pulleys, the flexible connection 10ª, and the rod 6, the lower arm of the bell crank 4 and the lower member 3 of the stanchion are brought in line in a vertical position, thus securing the head of the animal, and the device is locked by the engagement of the lever 14 with the catch 15.

What I claim as my invention, and desire to secure by United States Letters Patent, is:—

1. In a device for securing animals in stalls, in combination, a stanchion-frame, a stanchion consisting of two lower members pivotally connected with the lower portion of said frame, bell cranks, each having its lower arm in sliding connection with the upper portion of one of said lower members, and the other in pivotal connection with upwardly extending connecting arms pivotally connected in their upper portions with a rod and means for lifting said rod.

2. In a device for securing animals in stalls, in combination, a stanchion-frame, a stanchion consisting of two lower members pivotally connected with the lower portion of said frame, bell cranks, each having its lower arm in sliding connection with the upper portion of one of said lower members, and the other in pivotal connection with upwardly extending connecting arms pivotally connected in their upper portions with a rod and means for lifting said rod, a cross bar and a spring disposed on said rod, and having one terminal secured to said rod and the other terminal secured to said cross bar.

3. In a device for securing animals in stalls, in combination, a stanchion-frame, a stanchion consisting of two lower members pivotally connected with the lower portion of said frame, bell cranks, each having its lower arm in sliding connection with the upper portion of one of said lower members, and the other in pivotal connection with upwardly extending connecting arms pivotally connected in their upper portions with a rod and means for lifting said rod, a cross bar and a spring disposed on said rod, and having one terminal secured to said rod and the other terminal secured to said cross bar, and a stop on said rod adapted to hold said rod against the tension of said spring.

4. In a device for securing animals in stalls, in combination, a stanchion-frame, a stanchion consisting of two lower members pivotally connected with the lower portion of said frame, bell cranks, each having its lower arm in sliding connection with the upper portion of one of said lower members, and the other in pivotal connection with upwardly extending connecting arms pivotally connected in their upper portions with a rod and means for lifting said rod, a cross bar and a spring disposed on said rod, and having one terminal secured to said rod and the other terminal secured to said cross bar, and a stop on said rod adapted to hold said rod against the tension of said spring, and a flexible connection from said rod to a lever.

In testimony whereof I affix my signature in presence of two witnesses.

JOSEPH SCARAMUCCI.

Witnesses:
CHAS. E. MILLS,
EMILIO YANNIE.